(12) United States Patent
Hines et al.

(10) Patent No.: US 6,873,406 B1
(45) Date of Patent: Mar. 29, 2005

(54) TILT-COMPENSATED LASER RANGEFINDER

(75) Inventors: Robin H. Hines, Tullahoma, TN (US); Patrick J. Murphy, Tullahoma, TN (US); William L Goodman, Winchester, TN (US); Matthew A. Johnson, Lynchburg, TN (US)

(73) Assignee: Opti-Logic Corporation, Tullahoma, TN (US)

( * ) Notice: Subject to any disclaimer, the term of this patent is extended or adjusted under 35 U.S.C. 154(b) by 0 days.

(21) Appl. No.: 10/341,122

(22) Filed: Jan. 13, 2003

Related U.S. Application Data
(60) Provisional application No. 60/347,716, filed on Jan. 11, 2002.

(51) Int. Cl.[7] .............................. G01B 11/26; G01C 3/08
(52) U.S. Cl. .................................... 356/141.1; 356/5.01
(58) Field of Search .............................. 356/4.01–5.15, 356/141.1

(56) References Cited

U.S. PATENT DOCUMENTS

| | | | |
|---|---|---|---|
| 4,811,491 A | | 3/1989 | Phillips et al. ............. 33/366.1 |
| 5,291,262 A | | 3/1994 | Dunne ........................... 356/5 |
| 5,519,642 A | * | 5/1996 | Kishimoto ................... 700/286 |
| 5,650,949 A | * | 7/1997 | Kishimoto ................... 702/155 |
| 5,859,693 A | * | 1/1999 | Dunne et al. ............... 356/4.01 |
| 5,933,224 A | | 8/1999 | Hines et al. ................... 356/4 |
| 6,144,308 A | | 11/2000 | Dunne ........................ 340/689 |
| 6,262,801 B1 | * | 7/2001 | Shibuya et al. ........ 356/139.08 |

* cited by examiner

Primary Examiner—Bernarr E. Gregory
Assistant Examiner—Brian Andrea
(74) Attorney, Agent, or Firm—Waddey & Patterson, PC; Howard H. Bayless

(57) ABSTRACT

The present invention is a laser ranging device that incorporates an internal tilt sensor, an internal temperature sensor, and an internal pressure sensor. The tilt sensor is used to measure the target's vertical angle relative to the horizontal reference plane. Digital signal processing circuitry controls the firing of the laser pulse, calculation of time-of-flight range, measurement of the vertical angle of the tilt sensor, measurement of ambient temperature and storage of tilt sensor and temperature sensor calibration data. The digital signal processing circuitry then provides the user temperature corrected ballistic ranging information, including horizontal range. Additionally, an automatic gain control system minimizes the effects of target to target variance in reflectivity and its associated errors. It is also an object of this invention to electronically minimize errors in the measurement of a vertical angle caused by housing vibration and by temperature variance errors.

31 Claims, 8 Drawing Sheets

TILT-COMPENSATED LASER RANGEFINDER

This application claims the priority benefits under Title 35, United States Code, §119(e) of U.S. Provisional Application Ser. No. 60/347,716 filed on Jan. 11, 2002.

BACKGROUND OF THE INVENTION

The present invention relates generally to laser ranging devices and methods of calculating target ranging information and, more particularly, to tilt compensated laser ranging devices and methods of calculating target ranging information accounting for the vertical angle to a target.

Portable laser range finders are frequently used to determine the range from the user to a selected target. In this disclosure the term target is defined simply as the object for which ranging information is desired. A target may be simply a reference point on some structure, a topological feature, a building or a survey point. The target may also be the desired impact point of a ballistic projectile such as an arrow, a bullet, or even a golf ball. In determining ranging information regarding this second type of target, sportsmen, marksmen and others frequently use laser range finders. These laser range finders are typically handheld or are mounted on a tripod or other portable device. Current laser range finders measure the time-of-flight distance, otherwise know as the line-of-sight distance, between the range finder and the target. The time-of-flight distance is calculated by such laser range finders by first measuring the elapsed time between the firing of a laser pulse at the target and the detection of the reflected pulse, then multiplying that elapsed time by the appropriate value of the speed of light.

However, when used to provide ranging information for launching a ballistic projectile, all current laser range finders on the market have a common flaw. They do not give the user the correct aiming parameters for making uphill or downhill shots.

FIGS. 1a and 1b illustrate the ballistic projectile problem which this invention solves. For purposes of illustration, assume that the user is an archer and that an arrow is the projectile and a bow is the launcher. In FIG. 1a, the desired target 3 is on the same horizontal plane as the user 1. Or, as alternately expressed, the user 1 and target 3 are on the same vertical level. The laser range finder 2 provides the time-of-flight range 4 to the target 3, which is also the horizontal range 5 in this example. The user corrects the aim point of the launcher based on the horizontal range 5 and the ballistic equation. The arrow 6 follows the ballistic path 7.

It is a characteristic of the ballistic equation in a gravitational field that the distance a projectile is displaced in the downward vertical direction is dependent solely on the time of flight. Assuming that a projectile maintains a constant horizontal speed, it is the horizontal range to the target that determines how much the projectile drops when arriving at the target's horizontal range. This characteristic can present a problem to the user if the target is not in the same horizontal plane, but is displaced by some vertical distance as well as horizontal distance. Current laser range finders will provide only the time-of-flight distance to the target.

Referring now to the archery illustration in FIG. 1b, target 2a is at a higher vertical level than the user 1, while target 2b is at a lower vertical level. If only a current laser range finder 3 is available, the user 1 can only determine time-of-flight ranges 4a and 4b. If the user 1 corrects the aiming point based on these ranges, the result is an over shoot of the arrow 6 along ballistic paths 7a and 7b. However, the horizontal ranges 5a and 5b can be determined by a measurement of the angle at which of the line-of-sight direction to the target from the user intersects the user's horizontal plane. This is defined as the vertical angle. Since the time-of-flight ranges 4a and 4b are already known, the geometry of right triangles determines the horizontal ranges 5a and 5b. If the user 1 corrects the aiming point based on these horizontal ranges, the result is a target intersecting flight of the arrow 6 along corrected ballistic paths 9a and 9b.

Users employing portable laser range finders must currently make manual, in-field determination of the vertical angle of the target and of the horizontal range. There is currently a need for a portable laser range finder that measures time-of-flight range and vertical angle, and determines the horizontal range. Such a system should be relatively simple, inexpensive, reliable, easy to manufacture, relatively quick, and very stable in a variety of applications.

SUMMARY OF THE INVENTION

The present invention is a laser ranging device that incorporates an internal tilt sensor, an optional internal temperature sensor, and an optional internal pressure sensor. The tilt sensor is used to measure the target's vertical angle relative to the horizontal reference plane. Digital signal processing circuitry controls the firing of the laser pulse, calculation of time-of-flight range, measurement of the vertical angle of the tilt sensor, optional measurement of ambient temperature and storage of tilt sensor and optional temperature sensor calibration data. The digital signal processing circuitry then provides the user temperature corrected ballistic ranging information, including horizontal range. Additionally, an automatic gain control system minimizes the effects of target to target variance in reflectivity and its associated errors.

It is an object of this invention to electronically determine and display the horizontal range to a target having a non-zero vertical angle relative to the user.

It is also an object of this invention to electronically minimize errors in the measurement of a vertical angle caused by housing vibration and by temperature variance.

It is yet another object of this invention to electronically minimize errors in the measurement of time-of-flight range caused by variance in target surface reflectivity.

BRIEF DESCRIPTION OF THE DRAWINGS

FIG. 4 shows the alignment of FIGS. 4a–4c to form a flow chart.

DESCRIPTION OF THE PREFERRED EMBODIMENTS

Thus, although there have been described particular embodiments of the present invention of a new and useful Tilt Compensated Laser Range Finder, it is not intended that such references be construed as limitations upon the scope of this invention except as set forth in the following claims.

The present invention is a laser ranging device that incorporates an internal tilt sensor, an optional internal temperature sensor and an optional internal pressure sensor. The tilt sensor is used to measure the target's vertical angle relative to the horizontal reference plane. Digital signal processing circuitry controls the firing of the laser pulse, calculation of time-of-flight range, measurement of the vertical angle of the tilt sensor and storage of tilt sensor and temperature sensor calibration data. The digital signal processing circuitry then provides the user ballistic ranging information by using lookup tables and by using interpolation and extrapolation algorithms. The ballistic ranging information includes the horizontal range to the target. Note, the term "user" is defined to include a person operating the laser ranging device and to include an external targeting device or fire control system for controlling the aiming of a ballistic launcher. Means of providing such ballistic ranging information includes display of the information in an output display and also includes an output electronic data signal.

Figure 1A:
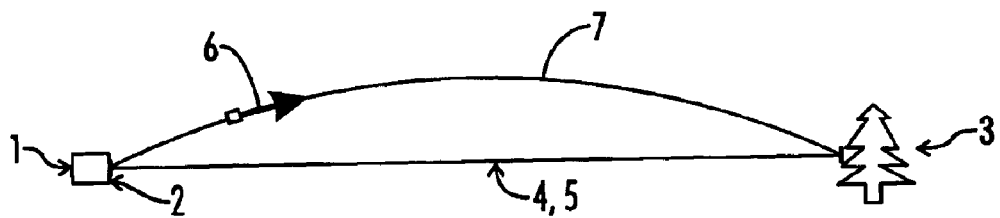
FIGS. 1a and 1b are pictorial diagrams of the ballistic problem solved by the present invention.
Figure 1B:
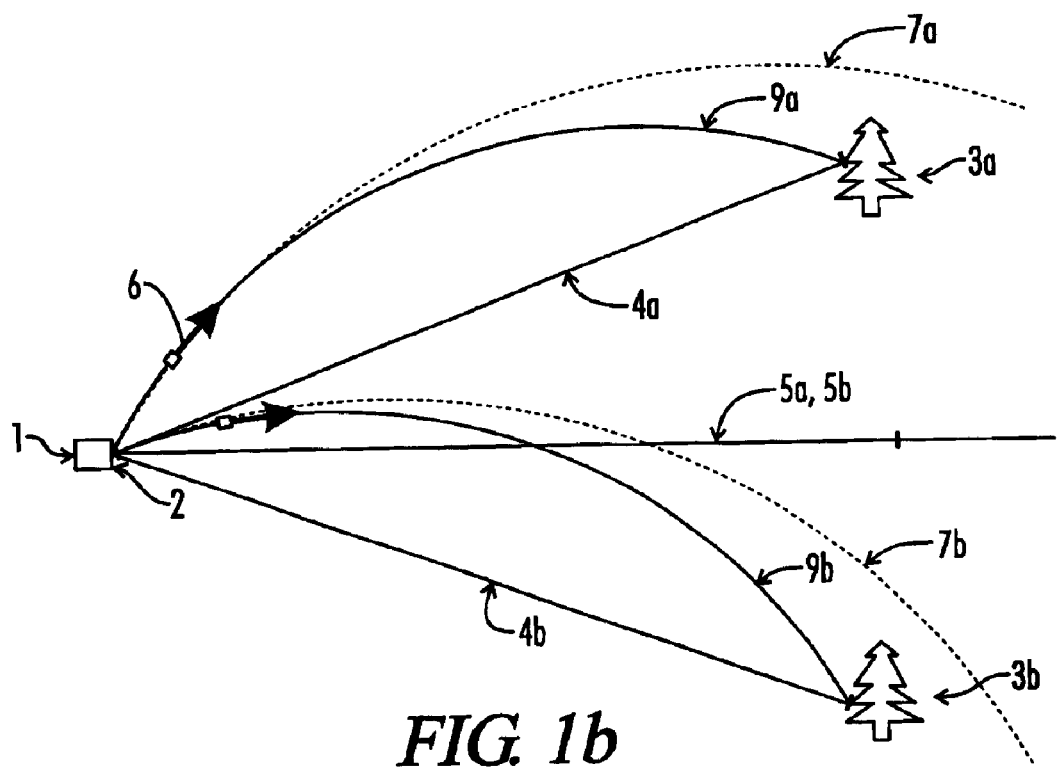
Figure 2:
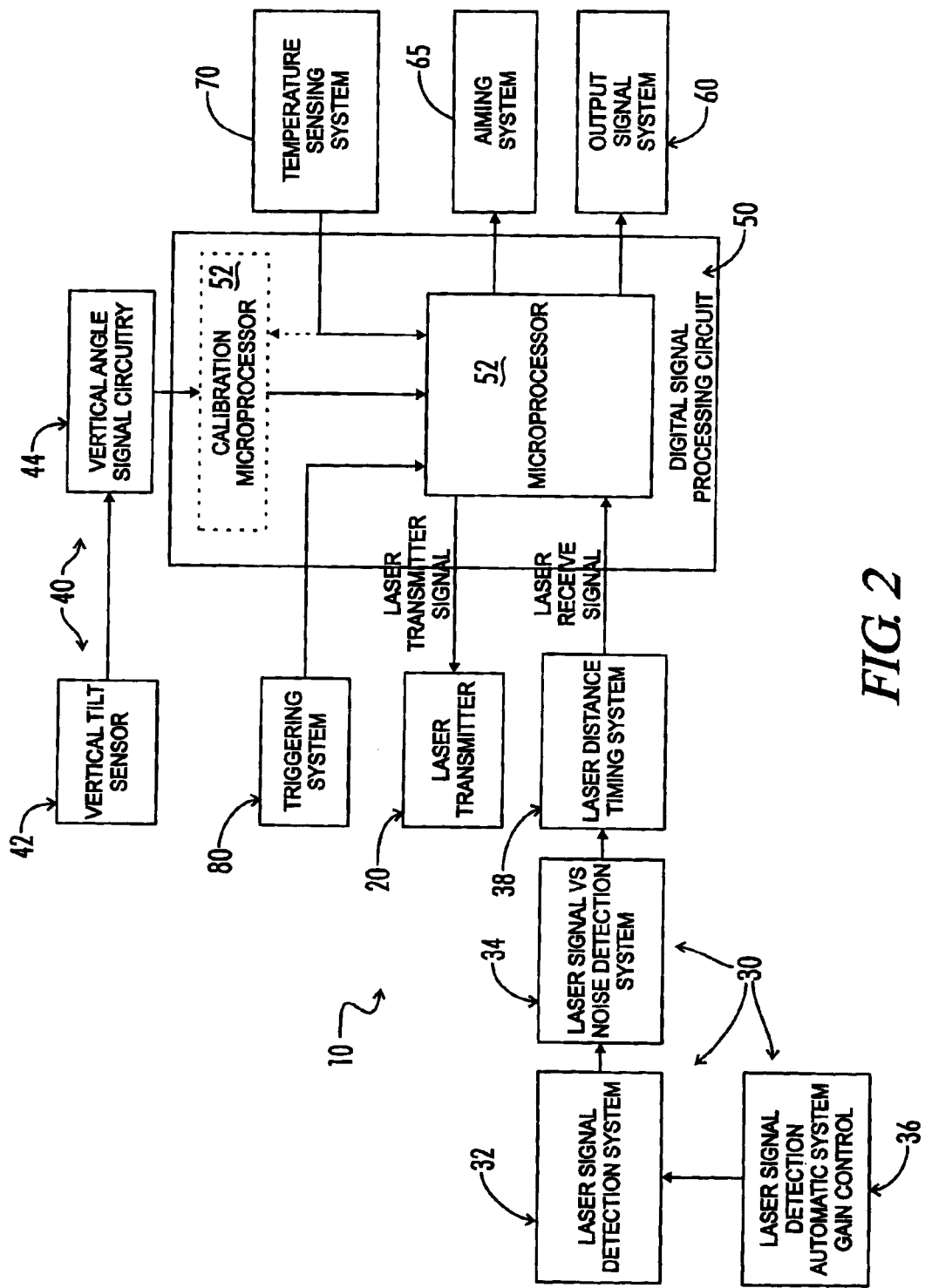
FIG. 2 is a block diagram of an embodiment of the present invention showing functional systems and components.
Figure 5:
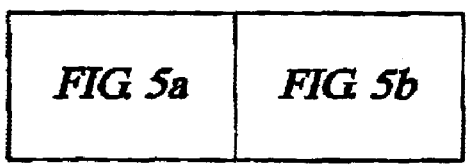
FIG. 5 shows the alignment of FIGS. 5a–5b to form a wiring schematic.
Figure 5A:
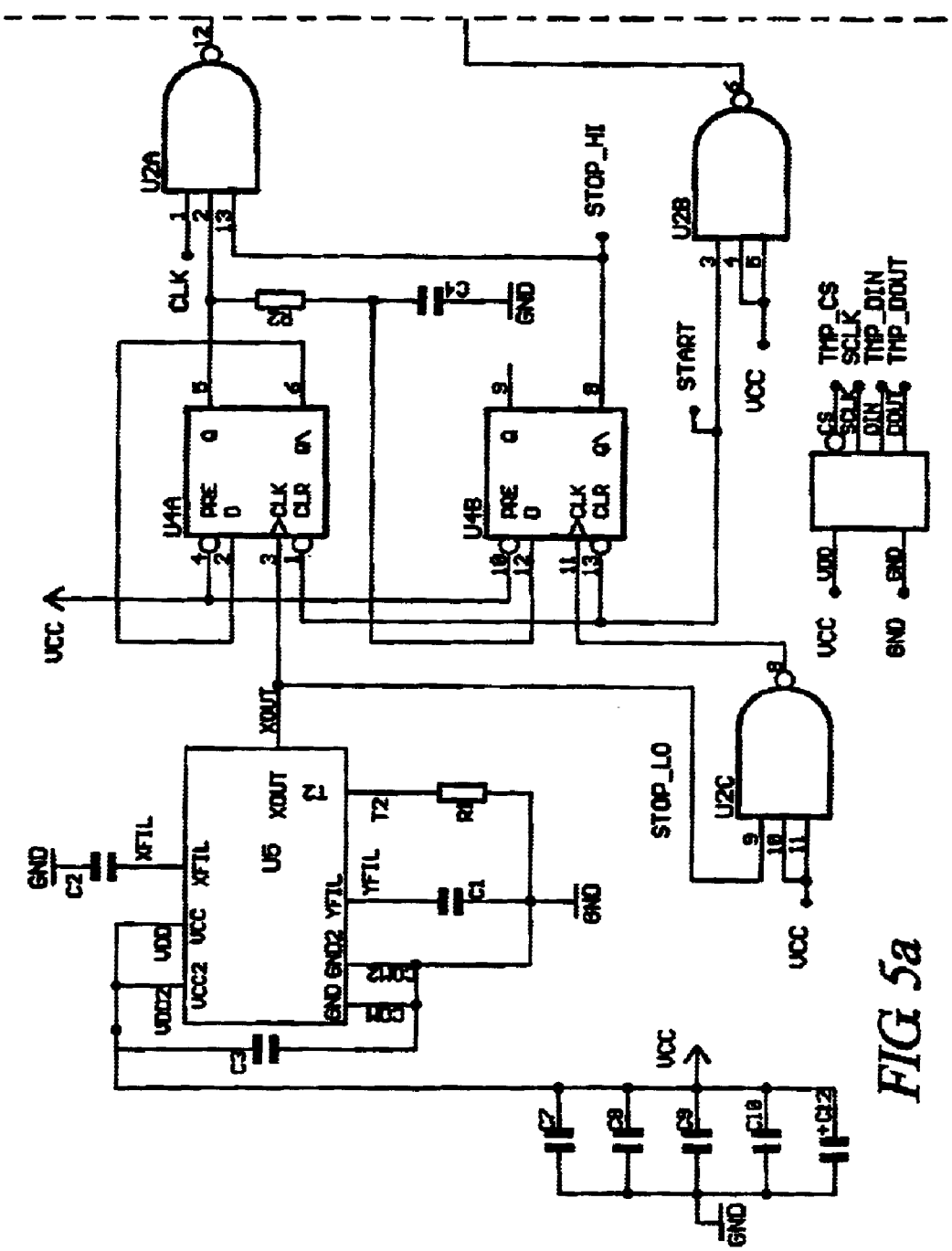
FIGS. 5a–5b comprise a wiring schematic of the embodiment of the invention.
Figure 5B:
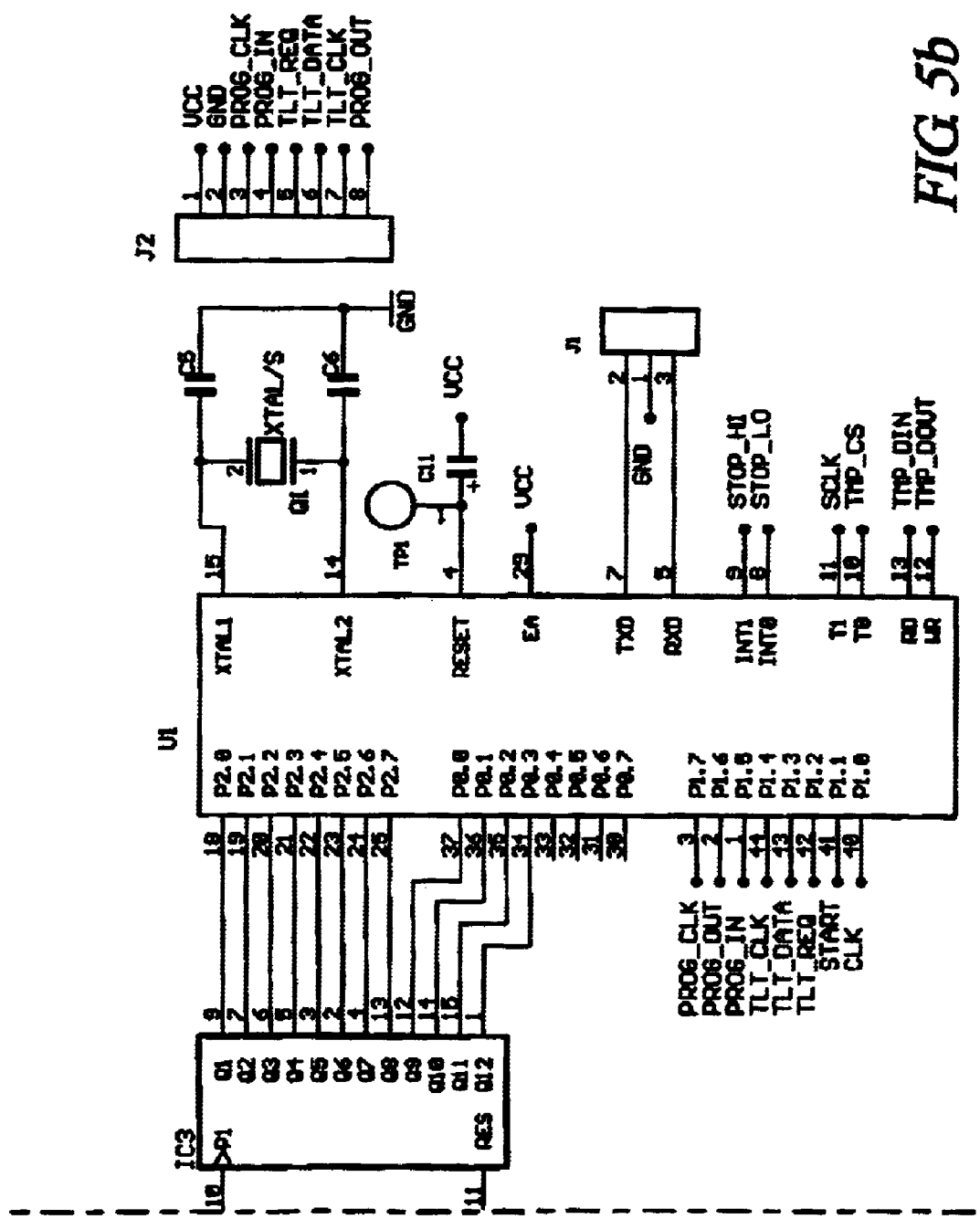

FIG. 2 shows a block diagram of one embodiment of the present invention. The block diagram illustrates the interrelations of this embodiment's component parts and is useful in describing how the invention functions. Manufacture of this embodiment of the invention has been accomplished using common, commercially available components. The Opti-Logic Corporation manufactures ome embodiment of this invention marketed as the Opti-Logic LH model range finder, a schematic of which is shown in FIGS. 5, 5a and 5b. FIG. 2 shows a tilt compensated laser ranging device 10 for determining ranging information for launching a ballistic projectile at a target that is at a different vertical height than the user. The device 10 of the present embodiment has a housing 90, said housing 90 not shown, that is suitable for handheld operations by virtue of being of small, lightweight and durable construction. For example, the Opti-Logic LH model embodiment has a housing 90 comprised of shock resistant plastic. The housing 90 weighs les than 11 ounce and has dimensions of approximately 8 in×6 in.×3 in. Other component materials could readily be substituted and other choices of dimensions could be readily employed. Other embodiments of the present invention have housing suitable other portable field operations. Such hous ane suitable for mounting to a tripod or other similar mounting device, or mounting to a ballistic launcher. Contemplated ballistic launcher include a bow, a crossbow, a rifle, shotgun, mortar or a grenade launcher.

A conventional internal power supply system, not shown, provides voltage for the electronic components of the device 10. In this embodiment an internal battery and a high voltage power supply is employed. Other conventional power supply systems could be substituted for the one of this embodiment.

To be used to determine ranging information to a selected target, the laser range finder device 10 must be sighted on the target. FIG. 2 shows an aiming system 65 disposed in the housing 90. The of the aiming system of the Opti-Logic LH embodiment comprises a low light reflex sighting system integrally constructed within the housing 90. In an alternative embodiment a targeting laser is substituted for the reflex sight. In this alternative embodiment, the laser transmitter 20 may be employed as both the targeting laser and the ranging laser. Other alternative embodiments employ readily available optical sighting systems, including: an optical reticle, a cross hairs etched on an optical element, a light emitting diode reticle, a liquid crystal display reticle, a pair of cross hairs, or aiming pin. Still other embodiments employ image magnification systems with the above-identified aiming systems.

Figure 4A:
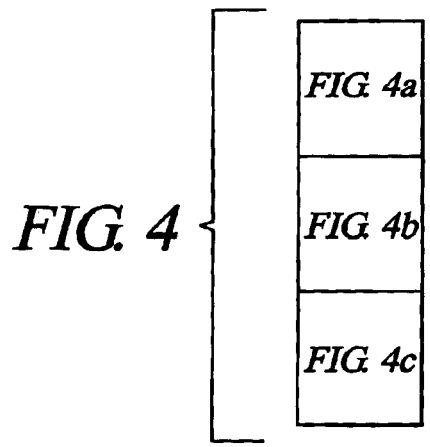
FIGS. 4a–4c comprise a flow chart illustrating the functions performed by the present invention in calculating ranging information.
Figure 4A:
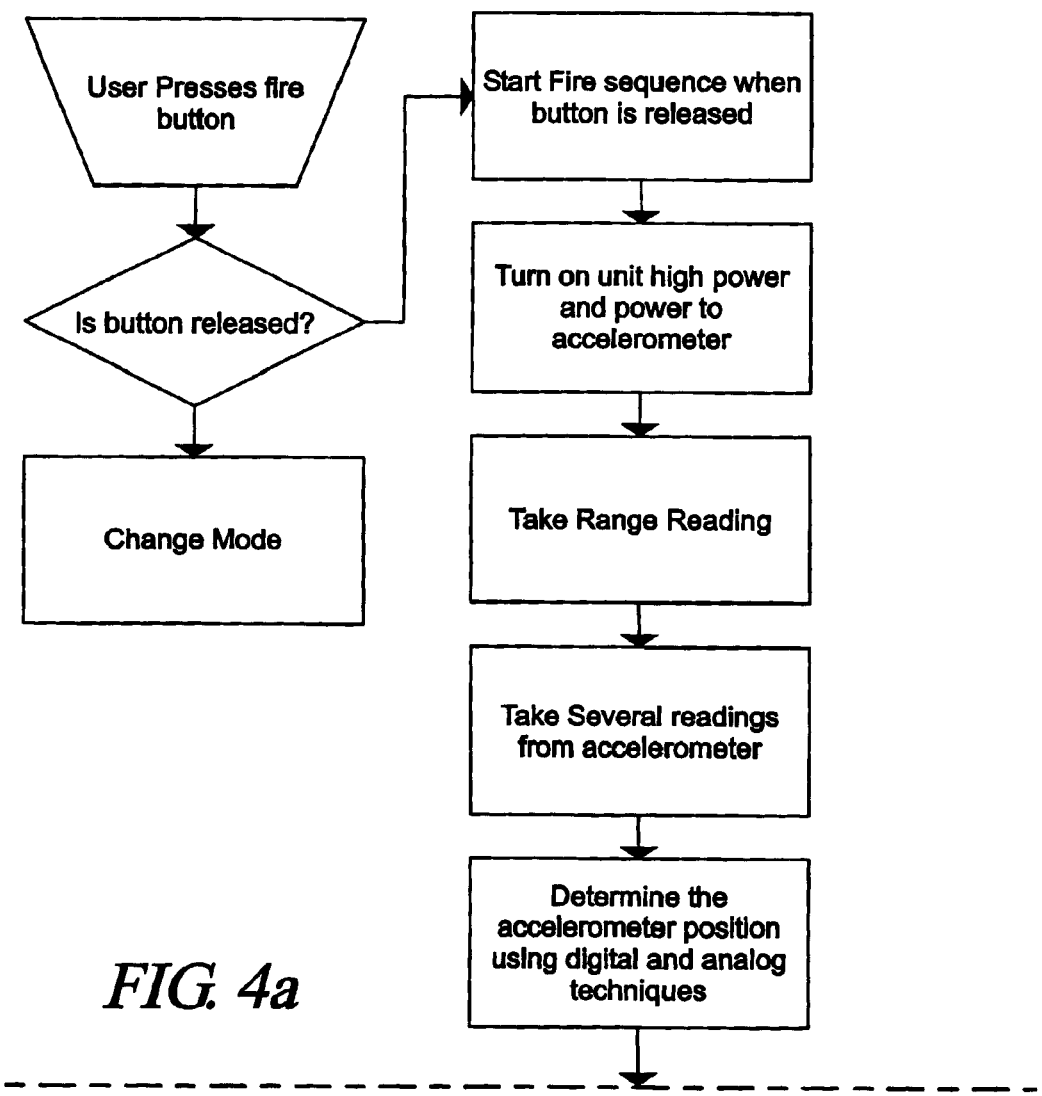

Referring to FIGS. 2 and 4a, with the target properly sighted within the aiming system 65, the user activates the triggering system 80 by manipulation of a switch. The triggering system 80 electronically signals the tilt compensated laser ranging device 10 to operate through one operating cycle. This electronic signal is herein referred to as the firing signal. The device 10 sequentially fires a series of laser pulses at the selected target and attempts to detect the reflected returns. The device also sequentially makes multiple measurements of the vertical angle of the target.

FIG. 2 shows a conventional laser transmitter 20 that is adapted to fire a laser pulse of short duration at a selected target. Referring to FIGS. 2 and 4a, upon receiving a firing signal, the laser transmitter emits a series of laser pulses for a period of time having a duration between 1 nano-seconds and 60 seconds. The series of laser pulses can be a continuous emission of laser pulses, a staggered emission of laser pulse or even the emission of a single pulse. The laser pulses comprise light energy laser pulses having a pulse repetition rate frequency of between 1 hertz and 20,000 hertz. Pulse repetition rate frequency may be held constant or varied. The laser transmitter may have an optional self-power limitation means to limit the emitted power such that the laser pulses are within a federal eye safe guidelines.

The emitted laser pulses are aimed at the surface of a selected target. When the pulses encounter the target, they are, to varying degrees, reflected, absorbed or refracted. The degree to which the pulses are reflected is determined by the amplitude of the reflected laser pulse compared to the amplitude of the transmitted laser pulse. The time-of-flight range, or line-of-sight range, to the selected target is calculated from the measurement of the elapsed time from the firing of a laser pulse to the detection of the corresponding reflected laser pulse.

FIG. 2 shows a laser pulse return detection system 30 which comprises a laser pulse return detector 32 for detecting the light energy at the pulse repetition rate frequency of the fired laser pulse and for generating a laser pulse return detector signal of an amplitude and duration that corresponds to the amplitude and duration of the detected light energy. The laser pulse return detector signals are electronically routed to the signal-to-noise discrimination system 34 which electronically discriminates each laser pulse return detector signal The laser pulse return detector signal is classified either as a actual reflected pulse return and a corresponding output of the laser pulse return detection system 30 is provided. Otherwise the laser pulse return detector signal is classified by the signal-to-noise discrimination system 34 as noise or as a false return, and no output of the laser pulse return detection system 30 is provided. In this embodiment, the output of the laser pulse return detection system 30 is a digital timing pulse signal of approximately uniform amplitude that corresponds to the time the corresponding laser pulse return was detected. In alternative embodiments, the laser pulse return detection system 30 simply passes each laser pulse return detector signal classified as an actual reflected pulse return, while blocking all other laser pulse return detector signals.

One source of error in calculating the time-of-flight distance to the target is caused when the signal-to-noise discrimination system 34 classifies a valid laser pulse return of very low amplitude. The corresponding laser pulse return detector signal will reach the gating threshold amplitude preset in signal-to-noise discrimination system 34 at a later point in the amplitude curve of the laser pulse return detector signal. This results in the signal-to-noise discrimination system 34 generating a digital timing pulse signal at a later elapsed time. The result is an error in time-of-flight range calculation.

The present invention minimizes such error. In FIG. 2, the automatic gain control system 36 is shown as controlling the gain of laser pulse return detector 32. The design approach taken in the invention is to control the gain of the laser pulse return detector 32 in a manner that reduces the variance in the amplitudes of said electronic signals from the laser pulse return detector 32 as compared to the variance in amplitudes of said detected return pulses. The automatic gain control system 32 of this embodiment of the present invention adjusts the gain of the laser pulse return detector 32 based on the amplitude of the previously received laser pulse return detector signal. If one pulse is lower than a certain average or threshold amplitude, the gain of the detector is increased. The result is that a majority of the laser is pulse return detector signals passed to the signal-to-noise discrimination system 36 have amplitudes within a predetermined range for optimal laser pulse return detector signal amplitude.

As stated above, the output of the laser pulse return detection system 30 is a digital timing pulse signal. That digital timing pulse signal is received by the laser distance timing system 38 which measures the elapsed time corresponding to the firing of any one laser pulse and the detection of its reflected return pulse. The laser pulse return detection system 30 provides the digital signal processing circuit 50 a digital data signal corresponding to the elapse time for each detected return pulse. In this embodiment of the invention, the digital signal processing circuit 50 comprises at least one microprocessor and a memory for storing instructions and data.

The digital signal processing circuit 50 calculates the time-of-flight range to the target corresponding to the elapsed time. To further minimize error in measuring and calculating the time-of-flight range for an operating cycle of the device 10, multiple measurement of the time-of-flight are taken. In this embodiment of the invention, a minimum of eight measurements of elapsed time are made for a series of fired laser pulses. In another embodiment of the invention, a minimum of one measurement of elapsed time is made for a series of fired laser pulses. The digital signal processing circuit 50 calculates the time-of-flight range to the target by using elapsed time data, elapsed time lookup tables and interpolation algorithms. In another embodiment of the invention, only elapsed time lookup tables are used. In still another embodiment of the invention, only elapsed time data is used. In this embodiment of the invention, the measured elapsed time data is averaged to determine the time-of-flight range.

A novel feature of this invention is to use an internal vertical tilt sensor system 40 for determining the vertical angle between the target and the reference horizontal of the device housing. The vertical tilt sensor system 40 is shown in FIG. 2 as comprising a vertical tilt sensor 42 and vertical angle signal circuitry 44 constructed to produce a data signal corresponding the vertical angle to the target. A novel feature of this embodiment of the invention is to use a micro-electronic machine accelerometer 41, including a micro-electronic machine silicone accelerometer, as an internal vertical tilt sensor 42. These accelerometers 41 have advantages to other machines, in that they can be used in a normal and in an inverted orientation to allow for either right-handed use or left-handed use by the user. Other embodiments of the invention employ other conventional vertical tilt sensors 42, including: an electrolytic liquid level tilt sensor, a optical bubble tilt sensor, a capacitive bubble tilt sensor, pendulum mechanism, rotary optical encoder, rotary electro-resistive encoder, hall effect device or a ceramic capacitive tilt sensor.

Another novel feature of this invention is to use the digital signal processing circuit 50 to calibrate the vertical tilt sensor 42 and to store vertical tilt sensor system calibration data. In this embodiment calibration is performed by stepping the accelerometer that comprises the vertical tilt sensor 42 through a series of discrete predetermined vertical angles, measuring the vertical angle data signals corresponding to said vertical angles and storing the measurement values of said vertical angle data signals corresponding to each predetermined vertical angle in vertical tilt sensor system calibration look-up tables store in the calibration microprocessor 52 that comprises the digital signal processing circuit 50, as shown in FIG. 2. Alternative embodiments of this invention use only a single microprocessor 52 of any other number, based on manufacturing concerns of cost, performance and availability. Operational measurement of a vertical angle is accomplished by comparing a measurement of vertical angle signal data to vertical tilt sensor system calibration look-up tables and using the high speed digital signal processing circuit 50 to interpolate the actual vertical angle. Other embodiments of the invention do not use interpolation algorithms, but rather use a very large calibration lookup table to determine an individual measurement of the vertical angle.

Figure 4B:
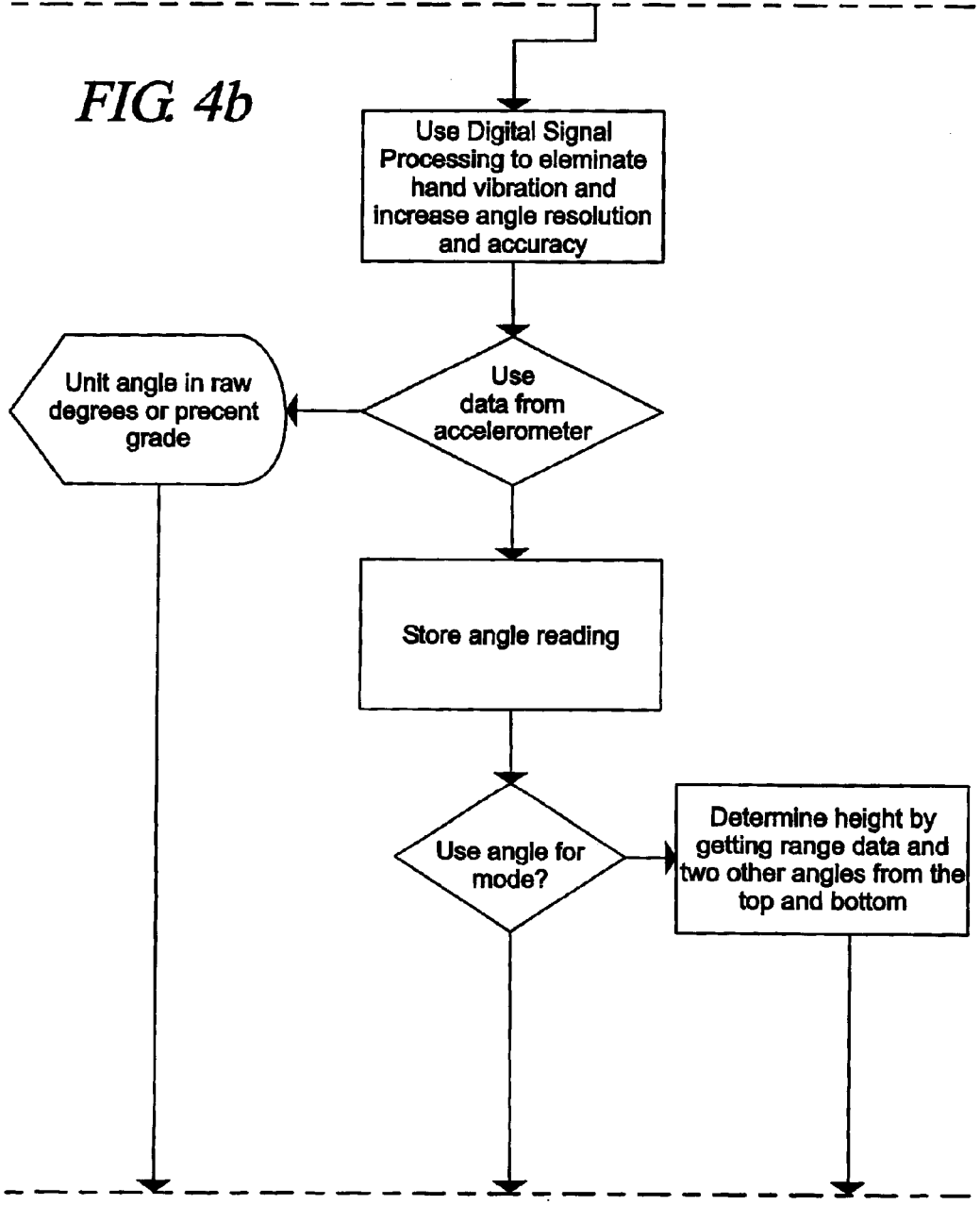

A common source of error in measuring the vertical angle to the target is vibration of the device 10 housing. This is especially true of this hand held embodiment of the invention. To further minimize error in measuring and calculating the vertical angle for an operating cycle of the device 10, multiple measurements of the data signal corresponding the vertical angle to the target are taken. In this embodiment of the invention, a minimum of sight measurements of vertical angle data are made for a series of fired laser pulses. In another embodiment of the invention, a minimum of one measurement of vertical angle data is made for a series of fired laser pulses. Referring to FIGS. 2 and 4b, the high speed digital signal processing circuit 50 then employs a vibration filtering algorithm to filter out the vibration of the housing. A second algorithm is used to determine the most accurate calculation of vertical angle. Working models of this embodiment have a demonstrated vertical angle accuracy of +/−0.1 degrees.

Another common source of error in measuring the vertical angle to the target is variances in the ambient temperature. The device 10 is assumed to be in thermal equilibrium with its environment. FIG. 2 shows a temperature sensor system 70 which produces a temperature data signal corresponding to ambient environmental temperature. The digital signal processing circuit 50 stores temperature sensor system calibration data in temperature sensor system calibration data look-up tables. When the digital signal processing circuit 50 calculates the vertical angle as previously described, it further calculates the ambient temperature from measured temperature data and stored temperature sensor system calibration data. The digital signal processing circuit 50 then applies temperature corrections to the vertical angle data.

Figure 3:
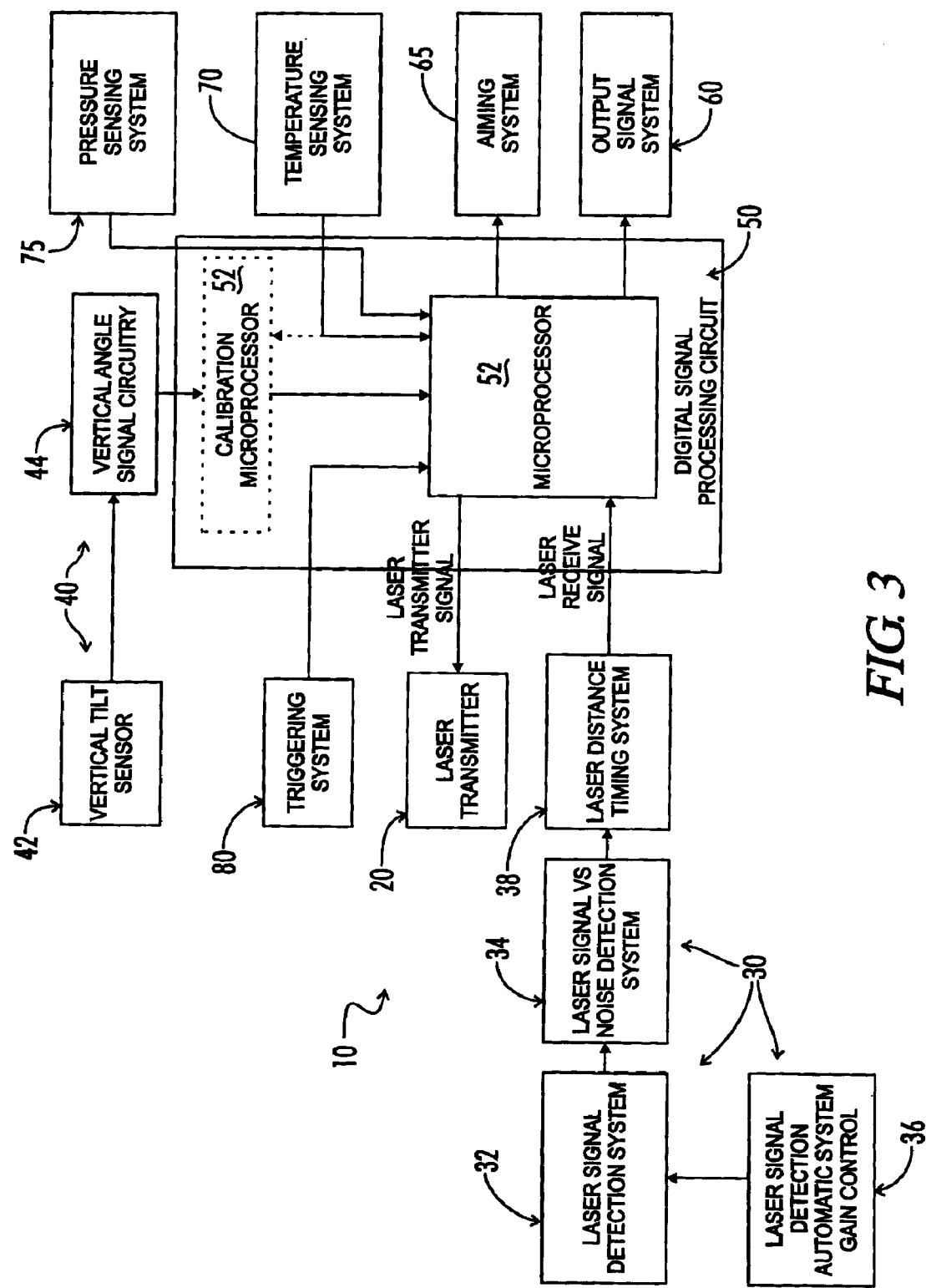
FIG. 3 is a block diagram of an alternative embodiment of the present invention showing functional systems and components.

An optional embodiment of this invention is shown in FIG. 3. An optional embodiment of this invention incorporates a pressure sensor system 75 to produce a digital data signal corresponding to the ambient atmospheric pressure.

Pressure measurement is useful in determining certain ballistic projectile paths. For a marksman to employ a pressure and temperature ballistic aim correction chart in the field to correct the aim point of a rifle firing a bullet, it is useful to have convenient pressure and temperature measurement readout.

Still another common source of error can be minimized by a novel feature of the triggering system 80 of the device 10. Referring to FIGS. 2 and 4a, the triggering system 80 of this embodiment of the invention comprises a user manipulated, release-to-return, spring loaded triggering switch or button. The trigger button has two positions. The up position is the release position. The down position is the standby position. The user must press and hold the button in the down for a period of time. The triggering system signals the digital signal processing circuit 50 to send a standby signal to the device components. While the user holds the trigger button in the standby position, the device is prevented from sending a firing signal to the laser transmitter and a standby voltage is applied to the device components. When the user releases the trigger button, the button springs to the up position and the digital signal processing circuit 50 to send a firing signal to the device components device components and causes a firing voltage to be applied to the laser transmitter. This release to fire feature minimizes the vibration caused by handheld operations. The result is more accurate readings with less user proficiency. Additionally, allowing the button to remain in the release position for period of time selectable between 1 second and 60 seconds causes low power voltage to be applied to the device components. This is a power conservation feature of the invention.

Each of these systems of the device are controlled by the digital processing circuit 50 as shown in FIG. 2. The digital signal processing circuit 50 of this embodiment is comprised of microprocessors 52 and associated memory for storing instruction and data. In an alternative embodiment, the digital signal processing circuit 50 is comprised of a logic circuit having a memory means. Besides calculation of horizontal range, digital signal processing circuit 50 of this embodiment is adapted to calculate the height of a target from a time-of-flight range, a vertical angle to the top of the target and a vertical angle to the bottom of the target.

Figure 4C:
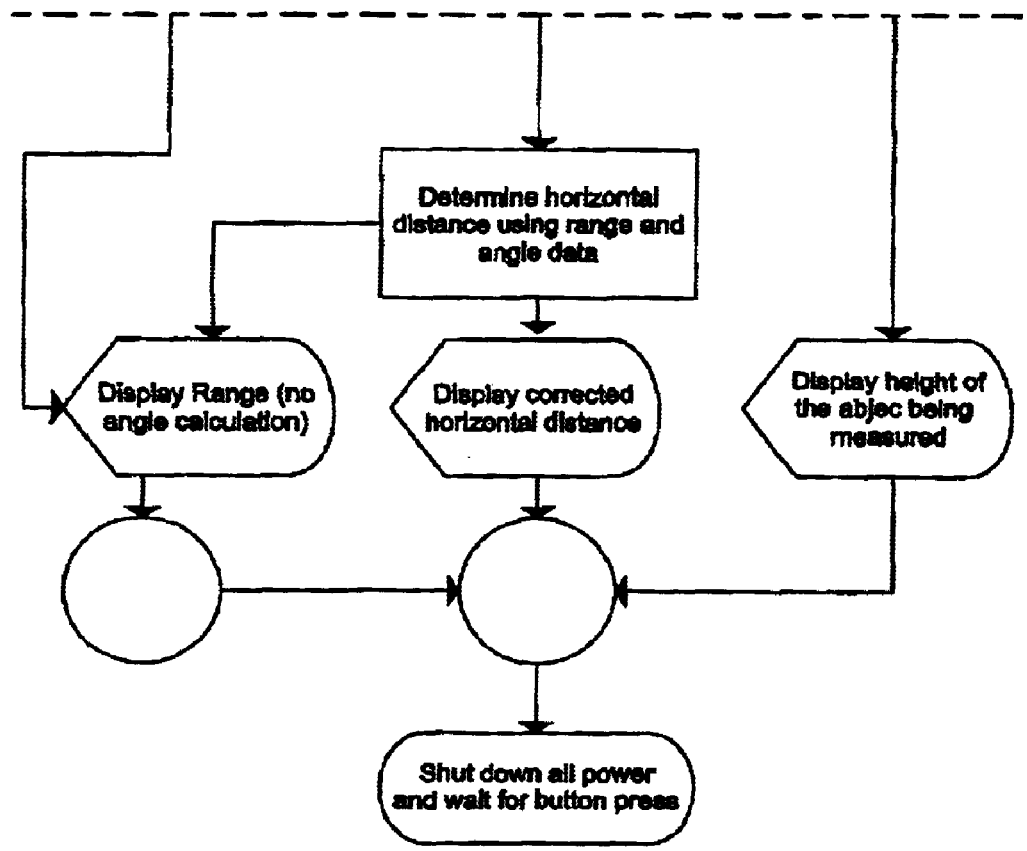

Referring to FIGS. 2 and 4c, the device 10 has an output signal system 60 which can selectively produce various data signal corresponding to the output parameter selected and according to the mode of operation of the device 10. In horizontal range mode, the output corresponds to the horizontal range to the target. Other selections for digital output include: the vertical angle to the target, the time of flight range to the target, ambient pressure and ambient temperature. According to this embodiment of the invention, a user readable output display system receives the data signal corresponding to the output parameter selected and displays the selected output data for the user. According to alternative embodiments, the data signal corresponding to the output parameter selected is provided as data signal input to an aiming system controlling the associated ballistic launcher.

The Opti-Logic XT embodiment of this invention utilizes the trigger button to select between the various modes of operation and output display. The device has an output signal system which can selectively produce various data signal corresponding to the output perimeter selected and according to the mode of operation of the device. In horizontal range mode, the output corresponds to the horizontal range to the target. Other selections for digital output would be the vertical angle to the target, the time of flight range, or otherwise known as the line of sight range to the target, and the pressure and temperature can selectively be displayed as well, according to this embodiment of the invention.

Thus, although there have been described particular embodiments of the present invention of a new and useful device for Tilt Compensated Laser Range Finder, it is not intended that such references be construed as limitations upon the scope of this invention except as set forth in the following claims.

What is claimed is:

1. A tilt compensated laser ranging device comprising:
   a housing disposed in a reference horizontal plane;
   a laser transmitter disposed within the housing and adapted to fire a series of laser pulses of short duration at a selected target, said series of laser pulses having a pulse repetition rate frequency, said selected target having a target surface, said target surface reflecting at least a portion of said series laser pulses as at least one return pulse, each said return pulse having an amplitude;
   a laser pulse return detection system disposed within the housing and comprising:
      a laser pulse return detector adapted to emit an electronic signal upon detection of each said return pulse, each said electronic signal having an amplitude corresponding to the amplitude of the detected return pulse;
      a signal-to-noise discriminator adapted to receive each said electronic signal from said laser pulse return detector;
      an automatic gain control system for adjusting the gain of the laser pulse return detector such that the variance in the amplitudes of said electronic signals from said laser pulse return detector is less than the variance in amplitudes of said detected return pulses;
   a vertical tilt sensor system disposed in the housing for determining a vertical angle between the target and the housing's reference horizontal plane, said vertical tilt sensor system comprising:
      a vertical tilt sensor; and
      vertical angle signal circuitry adapted to produce a vertical angle data signal corresponding to said vertical angle;
   a digital signal processing circuit disposed in the housing, said digital signal processing circuit comprising circuitry configured to:
      store vertical tilt sensor system calibration data, said vertical tilt sensor system calibration data comprising vertical tilt sensor system calibration look-up tables;
      calculate a time-of-flight range;
      calculate a vertical angle from data comprising vertical angle data and vertical tilt sensor system calibration data; and
      calculate a horizontal range from the time-of-flight range and the vertical angle;
   wherein vertical tilt sensor system calibration data is determined by stepping the vertical tilt sensor system through a series of discrete predetermined vertical angles, measuring the vertical angle data signals corresponding to said vertical angles and storing the measurement values of said vertical angle data signals corresponding to each predetermined vertical angle; and
   an output signal system disposed within the housing and adapted to selectable produce a horizontal range output data signal corresponding to the horizontal range to the target.

2. The device of claim 1 further comprising a temperature sensor system disposed in the housing and adapted to produce a temperature data signal corresponding to ambient environmental temperature.

3. The device of claim 2 wherein the digital signal processing circuit further comprises circuitry configured to:
store temperature sensor system calibration data, said calibration data comprising temperature sensor system calibration data look-up tables; and
calculate the vertical angle from data further comprising temperature data and temperature sensor system calibration data.

4. The device of claim 1 further comprising a triggering system adapted such that upon manipulation by a user, the triggering system electronically signals the tilt compensated laser ranging device to operate through one operating cycle, said operating cycle comprising sequentially firing at least one laser pulse and attempting to detect each reflected laser pulse, and further comprising sequentially making multiple measurements of the data signal corresponding to the vertical angle.

5. The device of claim 1 wherein the automatic gain control system adjusts the gain of the laser pulse return detector based on the amplitude of the previously received laser pulse return detector signal, such that a majority of said laser pulse return detector signals passed to the signal-to-noise discrimination system have amplitudes within a predetermined range for optimal laser pulse return detector signal amplitude.

6. The device of claim 1 wherein the housing is suitable for hand held operation.

7. The device of claim 1 wherein the housing is suitable for mounting to a user portable base.

8. The device of claim 1 wherein the housing is suitable for mounting to a user portable launcher.

9. The device of claim 8 wherein the user portable launcher comprises a launcher selected from the group a rifle, a shotgun, a pistol, a crossbow, a bow, a mortar, grenade launcher or a paintball gun.

10. The device of claim 1 further comprising an aiming system.

11. The device of claim 1 wherein the aiming system comprises a low light reflex sighting system.

12. The device of claim 1 wherein the aiming system comprises a targeting laser.

13. The device of claim 1 wherein the aiming system comprises an optical sight, said optical sight means selected from the group comprising: an optical reticle, a cross hairs etched on an optical element, a light emitting diode reticle, a liquid crystal display reticle, a pair of cross hairs, or aiming pin.

14. The device of claim 1 wherein the aiming system comprises an image magnification system.

15. The device of claim 1 further comprising a pressure sensor system disposed in the housing and constructed to produce a data signal corresponding to ambient atmospheric pressure.

16. The device of claim 1 wherein the vertical tilt sensor comprises an accelerometer.

17. The device of claim 16 wherein the accelerometer comprises a micro-electronic machine silicone accelerometer.

18. The device of claim 1 wherein the vertical tilt sensor comprises a sensor selected from the group comprising: an electrolytic liquid level tilt sensor, a optical bubble tilt sensor, a capacitive bubble tilt sensor, pendulum mechanism, rotary optical encoder, rotary electro-resistive encoder, hall effect device or a ceramic capacitive tilt sensor.

19. The device of claim 1 wherein the digital signal processing circuit further comprises at least one microprocessor having a memory means for storing instructions and data.

20. The device of claim 1 wherein the digital signal processing circuit comprises circuitry adapted to calculate the height of a target from a time-of-flight range and at least two vertical angles, wherein the at least two vertical angles comprise a vertical angle to the top of the target and a vertical angle to the bottom of the target.

21. The device of claim 1 wherein the digital signal processing circuit further comprises circuitry adapted to calculate time-of-flight range from multiple measurements of the elapsed time data signal.

22. The device of claim 1 wherein the digital signal processing circuit comprises circuitry adapted to calculate vertical angle from multiple measurements of the vertical angle data signal.

23. The device of claim 1 wherein the laser transmitter further comprises a laser transmitter adapted to fire said series of laser pulses for a period of time having duration of between 1 nano-seconds and 60 seconds, said laser pulses having a pulse repetition rate frequency of between 1 hertz and 20,000 hertz.

24. The device of claim 1 wherein the output signal system further comprises an output signal system adapted to selectably produce a data signal corresponding to the vertical angle to the target.

25. The device of claim 1 wherein the output signal system further comprises an output signal system constructed to selectably produce a data signal corresponding to an output parameter selected from the group comprising: time-of-flight range, height of target, ambient temperature, or ambient pressure.

26. The device of claim 1 wherein the output signal system comprises an output display system constructed to selectably display the horizontal range to the target.

27. The device of claim 1 wherein the output signal system comprises an output display system constructed to selectably display the vertical angle.

28. The device of claim 1 wherein the output signal system comprises an output display system constructed to selectably display output data selected from the group comprising: time-of-flight range, target height, temperature or pressure.

29. The device of claim 1 wherein the triggering system comprises:
a user manipulated, release-to-return triggering switch having at least two positions, said two positions comprising a standby position and a release position, wherein selection of the standby position requires continuous user manipulation while the standby position is selected and wherein removal of user manipulation automatically reselects the release position; and
a release to fire circuitry adapted such that user selection of the standby position of the triggering switch prevents a firing signal from being sent to the laser transmitter while causing a standby voltage to be applied to the device components, such that selection of the release position of the triggering switch causes a firing signal from being sent to the laser transmitter while causing a firing voltage to be applied to the device components, and such that selection of the release position of the triggering switch for a duration of period of time causes a low power voltage to be applied to the device components, said period of time selectable between 1 second and 60 seconds.

30. A tilt compensated laser ranging device for firing a series of laser pulses at a selected target and measuring target reflections of said laser pulses, said device comprising:

a laser pulse return detector for detecting reflected laser pulses and providing an electronic signal output corresponding to each detected reflected laser pulse, said laser pulse return detector further having an automatic gain control system that adjusts the gain of the laser pulse return detector, said adjustment based on the amplitude of the previously received laser pulse return detector signal, such that a majority of said laser pulse return detector signals have amplitudes within a predetermined range;

a vertical tilt sensor for determining the vertical angle to the target and having a vertical angle signal circuitry adapted to produce a vertical angle data signal corresponding to said vertical angle;

a temperature sensor adapted to produce a temperature data signal corresponding to ambient environmental temperature; and a microprocessor configured to:
 store vertical tilt sensor system calibration look-up tables;
 store temperature sensor system calibration data look-up tables;
 calculate a time-of-flight range;
 calculate a vertical angle from data comprising vertical angle data, vertical tilt sensor system calibration look-up tables, temperature data and temperature sensor system calibration data; and
 calculate a horizontal range from the time-of-flight range and the vertical angle;

wherein measurement of vertical angle data signals are taken at each of a series of discrete predetermined vertical angles and each measurement value of said vertical angle data signals and each corresponding predetermined vertical angle are stored in lookup tables; and wherein determination of the vertical angle to the target sequentially making multiple measurements of the data signal corresponding to the vertical angle.

31. A tilt compensated laser ranging device comprising:

a vertical tilt sensor system for determining a vertical angle between a reflected laser pulse and a reference horizontal plane, said vertical tilt sensor system comprising:
 a vertical tilt sensor; and
 vertical angle signal circuitry adapted to produce a vertical angle data signal corresponding to said vertical angle;

a digital signal processing circuit comprising circuitry configured to:
 calculate a time-of-flight range;
 calculate a vertical angle; and
 calculate a horizontal range from the time-of-flight range and the vertical angle; and an output signal system adapted to produce a horizontal range output data signal corresponding to the horizontal range to the target.

* * * * *